United States Patent
Balachandran et al.

(10) Patent No.: US 9,565,085 B2
(45) Date of Patent: Feb. 7, 2017

(54) AUTOMATICALLY DIAGNOSING AND RESOLVING WIRELESS NETWORK CONNECTIVITY ISSUES IN ELECTRONIC DEVICES

(71) Applicant: Apple Inc., Cupertino, CA (US)

(72) Inventors: Suresh Balachandran, Cupertino, CA (US); Yang-Meng A. Lin, Saratoga, CA (US); Nathan A. Kralian, San Jose, CA (US); Kenneth A. L. Wold, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 662 days.

(21) Appl. No.: 13/890,036

(22) Filed: May 8, 2013

(65) Prior Publication Data

US 2014/0280901 A1    Sep. 18, 2014

Related U.S. Application Data

(60) Provisional application No. 61/790,529, filed on Mar. 15, 2013.

(51) Int. Cl.
*G06F 15/173* (2006.01)
*H04L 12/26* (2006.01)
*H04W 24/04* (2009.01)

(52) U.S. Cl.
CPC .......... *H04L 43/0811* (2013.01); *H04W 24/04* (2013.01)

(58) Field of Classification Search
USPC .......................... 709/224, 245, 246, 220, 221
See application file for complete search history.

(56) References Cited

U.S. PATENT DOCUMENTS 7,426,576 B1 *   9/2008   Banga .............. H04L 29/12066
                                                707/999.003
2013/0204821 A1 * 8/2013   Keith, Jr. ................ G06F 11/26
                                                          706/46

* cited by examiner

*Primary Examiner* — Lan-Dai T Truong
(74) *Attorney, Agent, or Firm* — Sterne, Kessler, Goldstein & Fox P.L.L.C.

(57) ABSTRACT

The disclosed embodiments relate to approaches for diagnosing and resolving wireless network connectivity issues on an electronic device. The system includes a tool for automatically diagnosing and resolving wireless network connectivity issues on the electronic device. The tool may monitor and manage the wireless network connection on the electronic device. If a lack of wireless network connectivity is detected on the electronic device, the tool may run a series of test cases associated with wireless network connectivity issues on the electronic device. The tool may then notify the user of the results of the test cases, provide recommendations associated with the results to the user, and/or log data associated with the test cases.

24 Claims, 7 Drawing Sheets

AUTOMATICALLY DIAGNOSING AND RESOLVING WIRELESS NETWORK CONNECTIVITY ISSUES IN ELECTRONIC DEVICES

RELATED APPLICATION

This application claims the benefit of U.S. Provisional Application No. 61/790,529, entitled "Automatically Diagnosing and Resolving Wireless Network Connectivity Issues in Electronic Devices," by inventors Suresh Balachandran, Yang-Meng A. Lin, Nathan A. Kralian and Kenneth A. Wold, filed 15 Mar. 2013.

TECHNICAL FIELD

The disclosed embodiments relate to wireless networks. More specifically, the disclosed embodiments relate to techniques for automatically diagnosing and resolving wireless network connectivity issues in electronic devices.

BACKGROUND

Recent improvements in computing power and wireless networking technology have significantly increased the capabilities of electronic devices. For example, laptop computers, tablet computers, portable media players, smartphones, and/or other modern electronic devices are often equipped with WiFi capabilities that allow the electronic devices to stream audio and/or video, share desktops and/or user interfaces (UIs), and/or transfer files wirelessly among one another.

Electronic devices may sometimes experience wireless network connectivity issues. These issues may be caused and/or influenced by a variety of factors at different layers of the network stack and/or locations within the wireless environment, making straightforward diagnosis and/or resolution of these issues difficult. Consequently, mechanisms for diagnosing and resolving wireless connectivity issues would be advantageous.

SUMMARY

The disclosed embodiments relate to approaches for diagnosing and resolving wireless network connectivity issues on an electronic device. The system includes a tool for automatically diagnosing and resolving wireless network connectivity issues on the electronic device. The tool may monitor and manage the wireless network connection on the electronic device. If a lack of wireless network connectivity is detected on the electronic device, the tool may run a series of test cases associated with wireless network connectivity issues on the electronic device. The tool may then notify the user of the results of the test cases, provide recommendations associated with the results to the user, and/or log data associated with the test cases.

In some embodiments, the tool runs a test case that obtains a custom Domain Name System (DNS) entry from a wireless network configuration of the electronic device upon detecting a failure of the electronic device to perform DNS resolution using the wireless network connection. Upon subsequently detecting an ability of the electronic device to perform the DNS resolution without the custom DNS entry, the tool notifies a user of the electronic device of a lack of wireless network connectivity on the electronic device caused by an invalidity of the custom DNS entry.

This Summary is provided merely for purposes of summarizing some example embodiments to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described herein can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
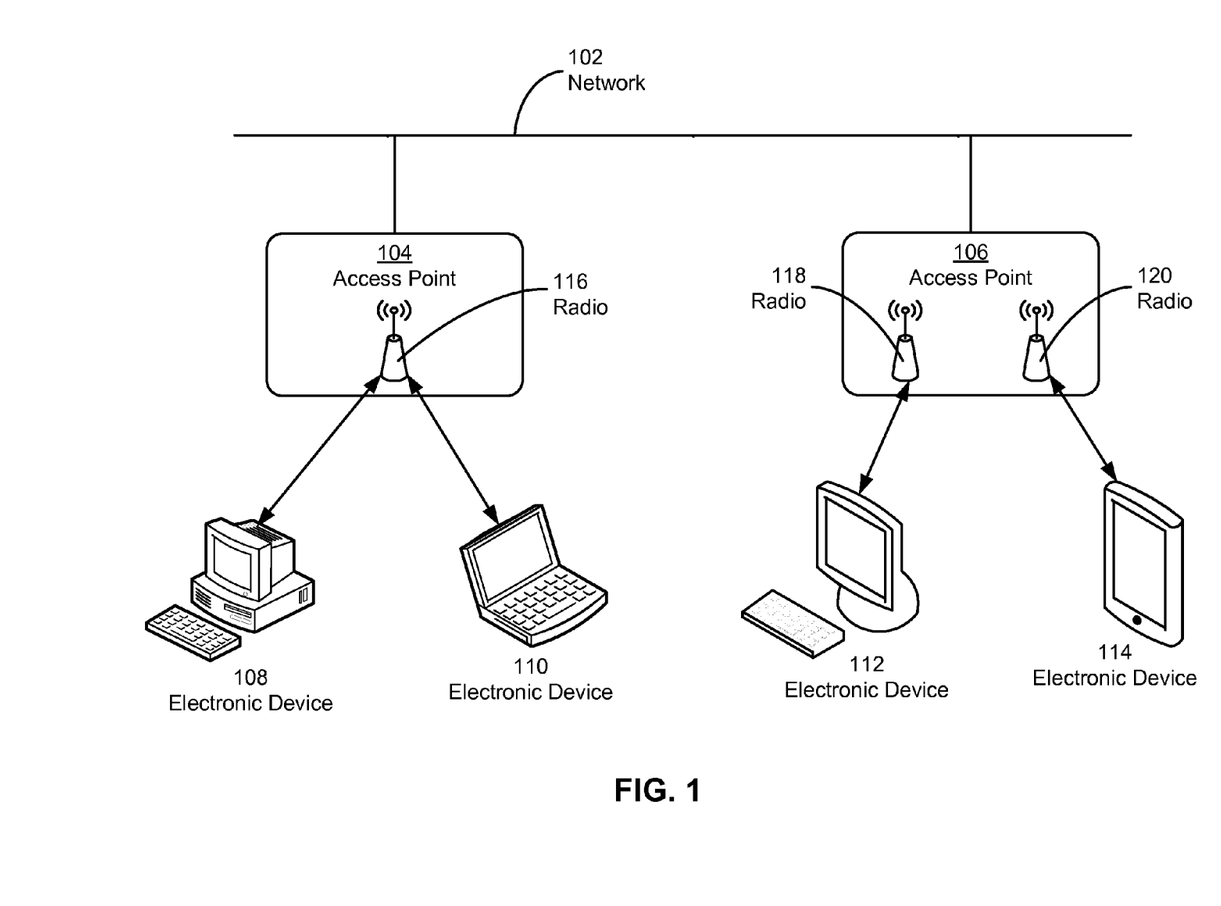
FIG. 1 shows a schematic of a system in accordance with the disclosed embodiments.

The disclosed embodiments provide a method and system for facilitating use of a wireless network connection on an electronic device. As shown in FIG. 1, a set of electronic devices 108-114 are connected to a network 102 through a set of access points 104-106 such as wireless access points, cellular towers, and/or other mechanisms for facilitating wireless communications on electronic devices 108-114. Electronic devices 108-114 may be personal computers, laptop computers, tablet computers, mobile phones, portable media players, digital media receivers, video game consoles, printers, scanners, and/or other electronic devices with wireless networking functionality. Network 102 may include a local area network (LAN), wide area network (WAN), personal area network (PAN), virtual private network, intranet, Internet, mobile phone network (e.g., a cellular network), WiFi network, Ethernet network, ad hoc network, and/or other type of network that facilitates communication among electronic devices (e.g., electronic devices 108-114) connected to network 102.

Electronic devices 108-114 may communicate with one another and/or with other electronic devices (e.g., servers) through network 102. For example, electronic devices 108-114 may use access points 104-106 and/or network 102 to retrieve web pages, send and receive emails, transfer files, stream audio and/or video, perform printing and/or scanning, and/or share desktops and/or user interfaces (UIs).

However, use of access points 104-106 and/or network 102 by electronic devices 108-114 may be affected by the wireless environment around access points 104-106 and/or network 102. For example, wireless network connectivity experienced by each electronic device 108-114 may be affected by environmental factors such as weather; distance between the electronic device and the access point (e.g., access points 104-106) to which the electronic device is connected; use and/or availability of frequencies, bands, and/or channels by the electronic device and/or one or more radios 116-120 of the access point; and/or interference in the vicinity of the electronic device and/or access point.

The ability of each electronic device 108-114 to establish a wireless network connection with network 102 may further be influenced by the wireless network configuration on the electronic device. For example, the electronic device may be unable to connect to another electronic device and/or the Internet if the electronic device has a misconfigured network address, proxy setting and/or Domain Name System (DNS) entry and/or if the security types, country codes, and/or other specifications supported by the electronic device and/or access point do not match.

Moreover, wireless network connectivity issues on electronic devices 108-114 may be difficult to diagnose and/or resolve. First, unexpected changes to the wireless environment around electronic devices 108-114 and/or access points 104-106 may be unpredictable and/or out of the control of the users of electronic devices 108-114. Second, misconfiguration of wireless network connections between electronic devices 108-114 and network 102 may occur in multiple ways and/or at multiple layers of the network stack, with attempts at resolving such misconfiguration potentially causing further misconfiguration of the wireless network connections. The complexity, unpredictability, and/or esoteric nature of such issues may prevent users of electronic devices 108-114 from acquiring the context, information, and/or knowledge to fix such issues. Instead, the users may resolve the issues through time-consuming, inconvenient, and/or costly interactions with technical support for electronic devices 108-114 and/or network administrators for network 102.

Figure 2:
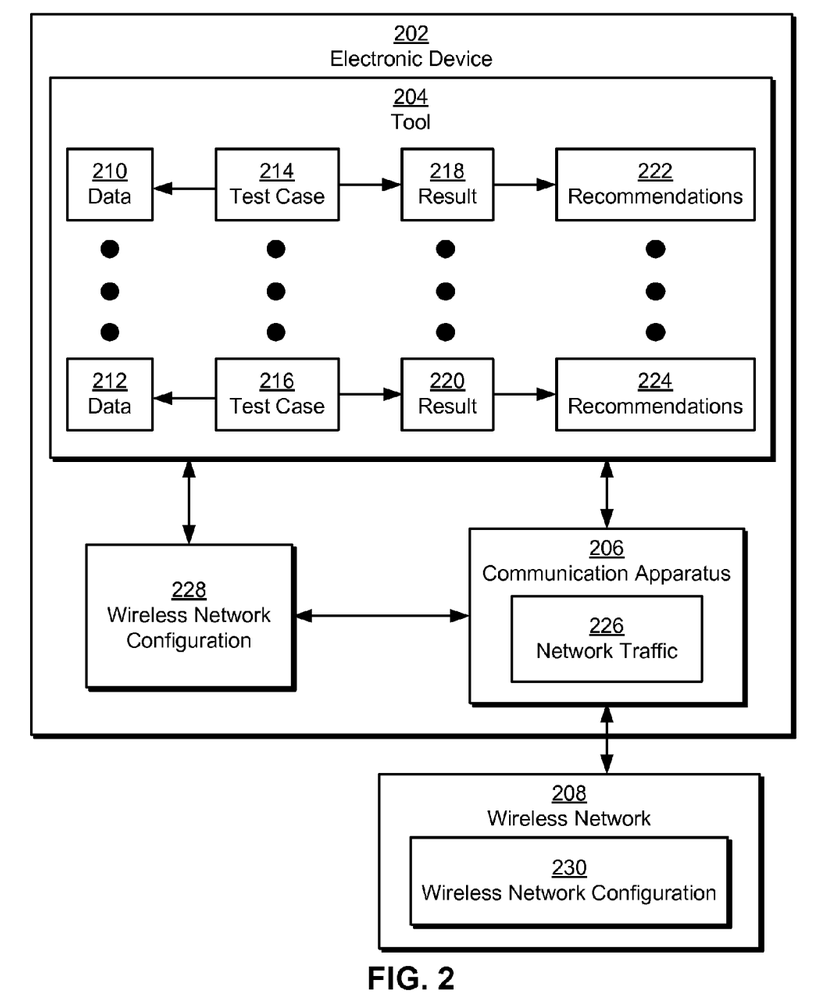
FIG. 2 shows a system for facilitating use of a wireless network connection on an electronic device in accordance with the disclosed embodiments.

In one or more embodiments, electronic devices 108-114 include functionality to diagnose and/or resolve wireless network connectivity issues associated with wireless network connections to access points 104-106. As shown in FIG. 2, an electronic device 202 includes a communication apparatus 206 such as a modem, wireless card, and/or other component that allows electronic device 202 to establish a wireless network connection with a wireless network 208 (e.g., WiFi network, cellular network, etc.) and send and receive network traffic 226 (e.g., network packets) over wireless network 208.

To connect with wireless network 208 and/or the Internet through wireless network 208, electronic device 202 may use a wireless network configuration 228 to configure the transmission and/or receipt of network traffic 226 on communication apparatus 206. For example, electronic device 202 may locate and/or establish a connection with wireless network 208 by matching a service set identifier (SSID), security key, and/or security type (e.g., Wired Equivalent Privacy (WEP), WiFi Protected Access (WPA), WiFi Protected Access II (WPA2)) for wireless network 208 in wireless network configuration 228 to a beacon frame containing a wireless network configuration 230 for wireless network 208. Electronic device 202 may then locate and/or communicate with other electronic devices (e.g., servers, computer systems, etc.) on the Internet by configuring network packets in network traffic 226 using DNS, proxy, and/or Internet Protocol (IP) settings from wireless network configuration 228.

Electronic device 202 also includes a tool 204 for monitoring and managing the wireless network connection between electronic device 202 and wireless network 208. For example, tool 204 may be an application that is configured to detect wireless network connectivity issues on electronic device 202, identify root causes of the wireless connectivity issues, provide recommendations related to the wireless connectivity issues, and/or gather data to facilitate debugging of the wireless connectivity issues.

During use of wireless network 208 by electronic device 202, tool 204 may identify a lack of wireless network connectivity in electronic device 202. The lack of wireless connectivity may be based on a notification from the user of electronic device 202. For example, the user may specify a lack of connectivity through a user interface with tool 204 in response to an inability to load a web page, download a file, send and/or receive emails, stream media, and/or otherwise connect to wireless network 208 from electronic device 202. The lack of wireless network connectivity may also be detected and/or verified by tool 204. For example, tool 204 may monitor the wireless network connection for changes in wireless network connectivity by periodically running one or more connectivity tests that test the ability of communication apparatus 206 to send and receive network traffic 226 using a default gateway, network address, DNS server, target host, and/or other components and/or attributes of wireless network 208.

More specifically, tool 204 may run one or more test cases 214-216 associated with wireless connectivity issues on electronic device 202, including test cases 214-216 for LAN, WAN, DNS, and/or target host connectivity. For example, tool 204 may test for LAN connectivity at the physical layer of the network stack and WAN connectivity at the network layer of the network stack.

Test cases 214-216 may also test for problems associated with wireless network configurations 228-230 and/or the wireless environment around electronic device 202 and/or wireless network 208. For example, test cases 214-216 may look for conflicts between wireless network configurations 228-230, interference issues, and/or signal quality issues. After each test case 214-216 is run, tool 204 may obtain a result 218-220 (e.g., pass, fail, etc.) of the test case. Tool 204 may also log data 210-212 associated with test cases 214-216, communication apparatus 206, and/or wireless network 208. The logged data 210-212 may be used in subsequent debugging of the wireless network connectivity issues by the user and/or a technical user (e.g., technical support). Tool 204 may also include functionality to interpret and/or analyze the logged data and present the analysis to the user and/or technical user. In other words, tool 204 may be capable of collecting and intelligently analyzing data associated with wireless network connectivity issues on electronic device 202.

Tool 204 may then provide one or more results 218-220 and/or one or more recommendations 222-224 associated with the result(s) to the user. For example, tool 204 may notify the user of all problems and/or failures found using test cases 214-216. For each problem and/or failure, tool 204 may present a recommendation for resolving the problem and/or failure, or tool 204 may automatically resolve the problem and/or failure for the user by modifying wireless network configuration 228.

In one or more embodiments, test cases 214-216 include a test case for testing and resolving DNS issues on electronic device 202. During the test case, the ability of electronic device 202 to perform DNS resolution is verified. First, DNS resolution on electronic device 202 is tested by, for example, attempting to resolve an address of a domain name using wireless network configuration 228. If the attempt at DNS resolution fails and a custom DNS entry is found, the test is repeated without the custom DNS entry. For example, the test may be conducted using a default DNS entry associated with wireless network 208 and/or a DNS entry for a DNS service such as OpenDNS (OpenDNS™ is a registered trademark of OpenDNS, Inc.) or Google Public DNS. If electronic device 202 passes the test, the user may be notified of a lack of wireless network connectivity caused by an invalidity of the custom DNS entry. The DNS resolution failure may also be automatically resolved by removing the custom DNS entry from wireless network configuration 228 and/or replacing the custom DNS entry with the default DNS entry and/or the DNS entry for the DNS service. Running a test case for testing and resolving DNS issues is discussed in further detail below with respect to FIG. 4.

Test cases 214-216 may also include a test case for country code mismatches, which verifies that electronic device 202 is in the right regulatory domain. During the test case, the geographical location and/or country code of electronic device 202 are obtained from wireless network configuration 228, along with the country code(s) of nearby wireless networks, including wireless network 208. If the country code of electronic device 202 does not match one or more of the country codes from the wireless network(s), electronic device 202 may not be configured to use the same channels as the wireless network(s) and may be unable to connect to the wireless network(s). The user of electronic device 202 may be notified of the mismatch and/or recommended to contact the network administrator of the corresponding wireless network(s). Running a test case for country code mismatches is discussed in further detail below with respect to FIG. 5.

Test cases 214-216 may further include a test case for conflicts associated with saved wireless networks. During the test case, conflicts between configuration settings for saved wireless networks on electronic device 202 and wireless network configuration 230 from wireless network 208 may be identified and resolved. First, the configuration settings are obtained from wireless network configuration 228, and wireless network configuration 230 is obtained from wireless network 208. If a conflict is found between the configuration settings and wireless network configuration 230, the user may be notified of the conflict. The conflict may also be automatically resolved by adapting the configuration settings to wireless network configuration 230. For example, a wireless network connection with a saved wireless network (e.g., wireless network 208) may be re-established from electronic device 202 by adapting the security type for the saved wireless network in wireless network configuration 228 to the security type found in the wireless network configuration (e.g., wireless network configuration 230) from the wireless network. Running a test case for conflicts associated with saved wireless networks is discussed in further detail below with respect to FIG. 6.

Finally, test cases 214-216 may include one or more of the following:

Parsing of logged data 210-212 and results 218-220 from test cases 214-216 and summarizing wireless network connectivity issues found using test cases 214-216. Here, tool 204 may be used to assess wireless network connectivity on electronic device 202 by running test cases 214-216, analyzing data 210-212 and results 218-220, and presenting results 218-220 to the user. In turn, the user and/or another user (e.g. technical support, network administrator, etc.) may be able to fix the wireless network connectivity issues without manually parsing logged data 210-212 and/or collecting additional data.

Detecting and troubleshooting issues with self-assigned IP addresses. If a self-assigned IP address is detected, a Dynamic Host Configuration Protocol (DHCP) refresh is performed, and the resulting packet exchange is sniffed and interpreted. The issue with the self-assigned IP address is isolated to either electronic device 202 or a router (e.g., of wireless network 208), and the user is informed of the identified cause of the issue.

Verifying network connectivity at different layers of the network stack. Network components that implement network functionality at different layers of the network stack are checked for wireless network connectivity. Any issues with a network component in any layer may result in wireless network connectivity issues. Methods of verifying network connectivity may be performed by tool 204 and compared with the behavior of the operating system of electronic device 202 to pinpoint issues in different layers of the operating system.

Detecting non-default wireless network configurations. Configuration settings from wireless network configuration 228 are compared with default configuration settings for electronic device 202. If the configuration settings do not match the default configuration settings, the user is alerted. Mismatches may occur with static IP addresses, DNS settings, proxy settings, network locations, and/or firewall configurations.

Identifying security mismatches across wireless networks with the same name. If multiple security modes (e.g., WEP, WPA, WPA2, etc.) are found for the same wireless network name and/or SSID, the wireless network corresponding to the wireless network name and/or SSID is flagged.

Automatically detecting random connection drops. If all connectivity tests pass, the user is offered the option to monitor the wireless network connection. Drops in wireless network connectivity and/or failures to rejoin saved wireless networks after waking from sleep mode and/or rebooting are detected in this mode. The connection may be monitored for a pre-specified period (e.g., 24 hours), and the option to continue monitoring may be provided to the user at the end of the period. If a drop in connection is detected, the wireless network connectivity issue associated with the drop is diagnosed by running appropriate tests (e.g., test cases 214-216) and logging the corresponding data (e.g., data 210-212) and results (e.g., results 218-220).

Monitoring Bluetooth (Bluetooth™ is a registered trademark of Bluetooth SIG, Inc.) connections and wireless network connections for co-existence issues. All paired Bluetooth devices are listed and saved in a log file. During monitoring of the wireless network connection, connection and/or disconnection of Bluetooth devices are logged, along with Bluetooth and/or wireless network activity and/or interference between the Bluetooth and wireless network connections.

Looking up of beacon interval value in beacon frames. Beacon interval information is obtained from a beacon frame for wireless network 208. The beacon interval is verified to be 100 ms/102 ms. If the beacon interval value is different, the user is recommended to change the beacon interval on his/her wireless router.

Looking up of delivery traffic indication message (DTIM) value in beacon frames. The DTIM count value is obtained from a beacon frame for wireless network 208. If the value is greater than 3, the user is recommended to lower the value to 3.

Looking up of wireless signal-to-noise ratio. The signal-to-noise ratio of wireless network 208 is sampled periodically (e.g., every second) for a pre-specified period (e.g., 10 seconds). If the signal-to-noise ratio falls below a threshold (e.g., 10-20 dBm), the user is advised of a high noise level that can affect the wireless network connection. The user is also recommended to look for possible sources of interference.

Sampling of wireless transmission rate on electronic device 202. The transmission rate of network traffic 226 over the wireless network connection with wireless network 208 is sampled, and possible solutions are recommended to the user based on the transmission rate.

Sampling of wireless signal strength. The signal strength (e.g., received signal strength indicator (RSSI)) of the wireless network connection with wireless network 208 is periodically (e.g., every second) sampled for a pre-specified period (e.g., 10 seconds). If the signal strength falls below a pre-specified threshold (e.g., −75 dBm), the user is recommended to move closer to the source of the signal (e.g., an access point).

Configuration of hidden wireless networks. Detect if wireless network 208 is hidden (e.g., transmits beacon frames that lack an SSID). If so, a recommendation to broadcast the SSID of wireless network 208 is made to the user.

Captive portal lookup. Test if wireless network 208 is a captive portal network. If a captive portal is embedded in wireless network 208, alert the user of the captive portal only if any of the connectivity tests fail. The user is recommended to contact the network administrator of wireless network 208 if the wireless network connection is not working.

Channel selection in 2.4-GHz and 5-GHz bands. Two clean channels in each of the 2.4-GHz and 5-GHz 802.11 bands are offered. If the currently associated wireless network 208 is on a different channel from one of the offered channels, a suggestion is made to switch channels. The switch may also be pushed to an access point for wireless network 208 if possible, and the user may be prompted to accept the switch. If no clean wireless networks are available in the 2.4-GHz range, the user is recommended to switch to 5-GHz to improve performance. Dynamic Frequency Selection (DFS) channels and associated limitations are also considered during selection of the offered channels. For example, selection of clean channels may account for the number of wireless networks per channel, signal strengths of the wireless networks, and/or 40-MHz channel widths in the 2.4-GHz range.

Testing for Simple Mail Transfer Protocol (SMTP) port accessibility. Detect if the SMTP port can be accessed through the wireless network connection with wireless network 208. If electronic device 202 cannot connect to the SMTP port, the failure to connect is logged, and the user is informed of the unavailability of some networking activity (e.g., sending and receiving emails).

Detecting weak wireless security. If wireless network 208 is open and/or operating in WPA/WPA2 mixed mode and electronic device 202 is experiencing wireless network connectivity issues, recommend that the user upgrade to WPA2 security on wireless network 208.

Detecting of large saved network lists. The number of entries in the saved networks list of wireless network configuration 228 is logged. For example, the number of entries is logged if the number of saved wireless networks in wireless configuration 228 is greater than 7. Because the number of saved wireless networks may impact the performance of electronic device 202 in auto joining the saved wireless networks, the logged number may be useful for debugging purposes.

By running test cases 214-216 for a variety of environmental and/or configuration problems associated with wireless network connectivity issues, tool 204 may identify root causes of the wireless network connectivity issues across multiple layers of the network stack and/or various locations within the wireless environment. In addition, tool 204 may facilitate resolution of the wireless network connectivity issues by providing results 218-220 and/or recommendations 222-224 associated with test cases 214-216 to the user and/or automatically updating wireless network configuration 228. Finally, tool 204 may log data 210-212 collected during test cases 214-216 to enable subsequent debugging and/or management of the wireless network connectivity issues by the user and/or other users.

Figure 3:
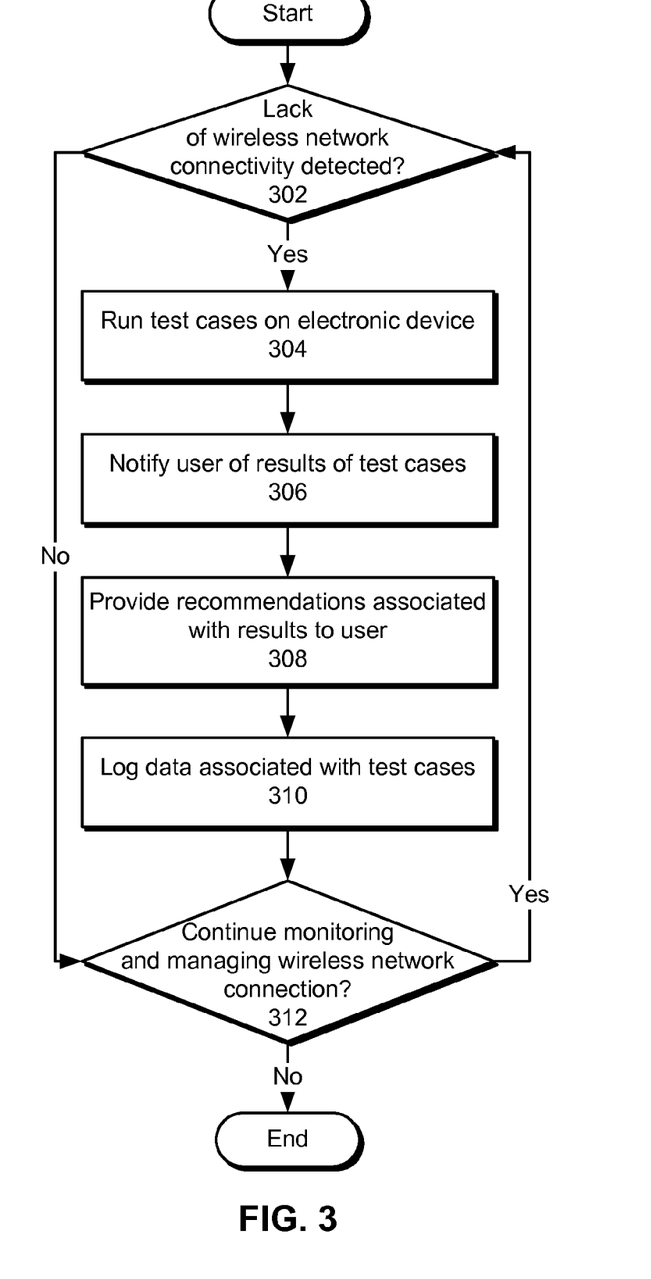
FIG. 3 shows a flowchart illustrating the process of facilitating use of a wireless network connection on an electronic device in accordance with the disclosed embodiments.

FIG. 3 shows a flowchart illustrating the process of facilitating use of a wireless network connection on an electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a lack of wireless network connectivity may be detected (operation 302) on the electronic device. For example, the lack of wireless network connectivity may be obtained using a notification from a user of the electronic device, or the lack of wireless network connectivity may be detected and/or verified using one or more connectivity tests run by a tool on the electronic device.

The connectivity tests may be included in a set of test cases, which are run (operation 304) if the lack of wireless network connectivity is identified. The test cases may include tests for various types (e.g., LAN, WAN, DNS, target host) of connectivity, wireless network configuration mismatches, attributes of the wireless environment, and/or other factors that may affect wireless network connectivity on the electronic device. The user may also be notified of results of the test cases (operation 306), recommendations associated with the results may be provided to the user (operation 308), and data associated with the test cases may be logged (operation 310). For example, the user may be presented with a list of wireless network connectivity issues found using the test cases, as well as recommendations for resolving the wireless network connectivity issues. One or more of the wireless network connectivity issues may also be automatically resolved by updating the wireless network configuration of the electronic device. At the same time, data from the test cases may be collected and recorded for subsequent use in debugging and/or managing the wireless network connectivity issues by the user and/or other users.

Monitoring and managing of the wireless network connection may continue (operation 312). For example, the wireless network connection may periodically be monitored over the course of a pre-specified period (e.g., a day), which may be extended by the user at the end of the pre-specified period. Alternatively, the wireless network connection may be monitored continuously in the background and/or upon request by the user. If monitoring and managing of the wireless network connection is to continue, any subsequent lack of wireless network connectivity is detected (operation 302), and use of the wireless network connection is facilitated by running test cases (operation 304), notifying the user of results of the test cases (operation 306), providing recommendations associated with the results to the user (operation 308), and/or logging data associated with the test cases (operation 310). Such automatic diagnosis and resolution of wireless network connectivity issues may continue until monitoring and/or managing of the wireless network is disabled and/or the wireless network connection and/or electronic device are no longer used.

Figure 4:
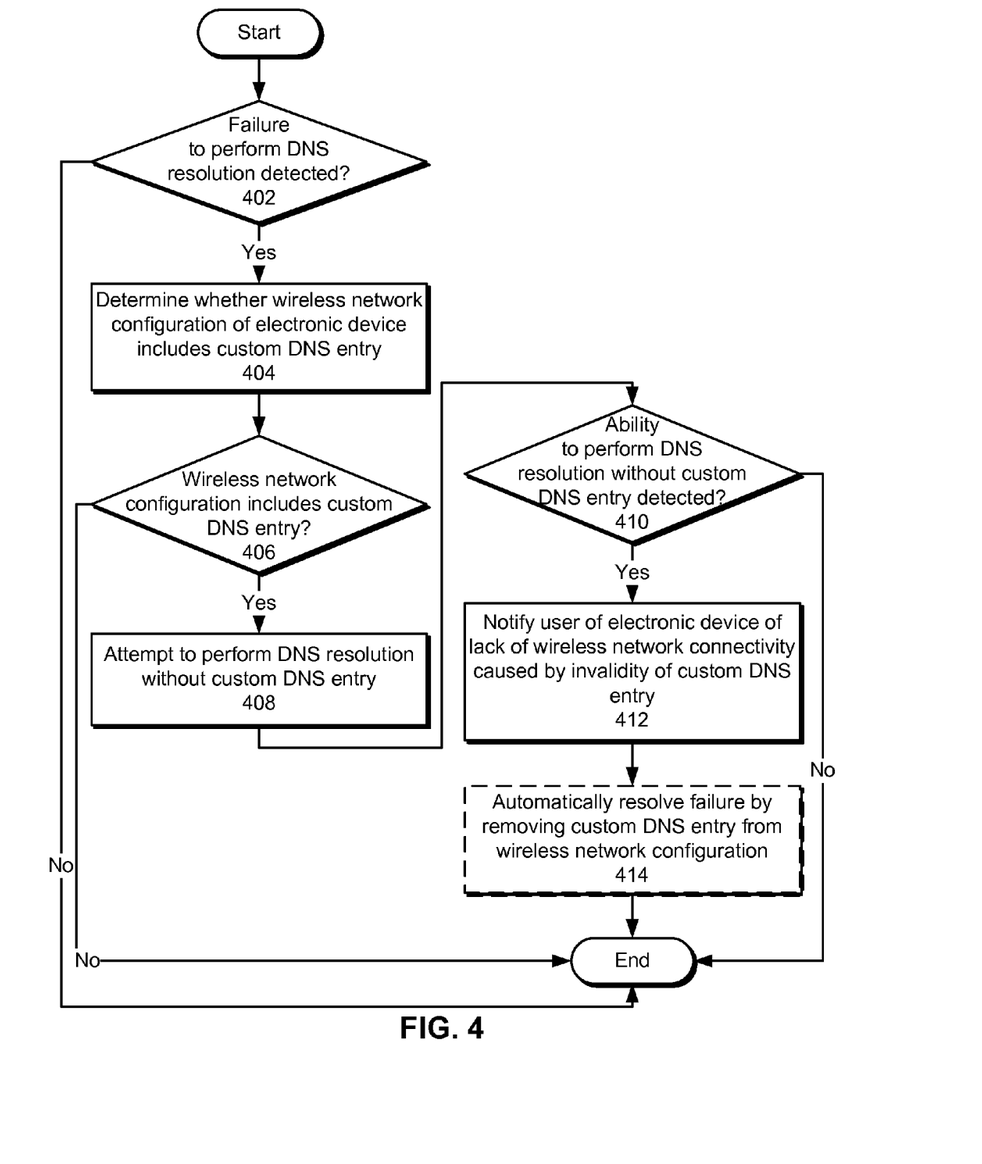
FIG. 4 shows a flowchart illustrating the process of running a test case associated with wireless network connectivity issues on an electronic device in accordance with the disclosed embodiments.

FIG. 4 shows a flowchart illustrating the process of running a test case associated with wireless network connectivity issues on an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a failure of the electronic device to perform DNS resolution may be detected (operation 402). For example, DNS resolution on the electronic device may be tested by attempting to resolve an address of a particular domain name using a wireless configuration of the electronic device. If the electronic device is capable of performing DNS resolution, the electronic device may pass the test case. If the electronic device is not capable of performing DNS resolution, the presence of a custom DNS entry in the wireless network configuration is determined (operation 404). If the wireless network configuration does not include the custom DNS entry, the remainder of the test case is skipped.

If the wireless network configuration includes the custom DNS entry, DNS resolution may be attempted without the custom DNS entry (operation 408) to determine if the electronic device has the ability to perform DNS resolution without the custom DNS entry (operation 410). For example, DNS resolution on the electronic device may be attempted using a default DNS entry (e.g., from an Internet Service Provider (ISP)) and/or a DNS entry from a third-party DNS service. If the electronic device is still unable to perform DNS resolution, the failure to perform DNS resolution may be caused by other wireless network connectivity issues, and additional test cases may be run to diagnose and/or resolve the wireless network connectivity issues, as discussed in further detail below with respect to FIGS. 5-6.

If the electronic device is able to perform DNS resolution without the custom DNS entry, the user of the electronic device is notified of a lack of wireless network connectivity caused by an invalidity of the custom DNS entry (operation 412). For example, the user may be notified of the failure to perform DNS resolution on the electronic device and provided a recommendation to resolve the failure by deleting the custom DNS entry. The failure may optionally be automatically resolved by removing the custom DNS entry from the wireless network configuration (operation 414).

The flowchart of FIG. 4 may also be used to identify other DNS-related wireless network connectivity issues in the electronic device. For example, operations 402-410 may be performed with the default DNS entry instead of the custom DNS entry if no custom DNS entry is specified in the wireless network configuration. The ability of the electronic device to perform DNS resolution without the default DNS entry may be tested in operation 406 by attempting to perform DNS resolution using a DNS entry from a third-party DNS service. If the electronic device is able to perform DNS resolution using the third-party DNS service, the user may be notified of the invalidity of the default DNS entry and/or given a recommendation to contact his/her ISP for further assistance.

Figure 5:
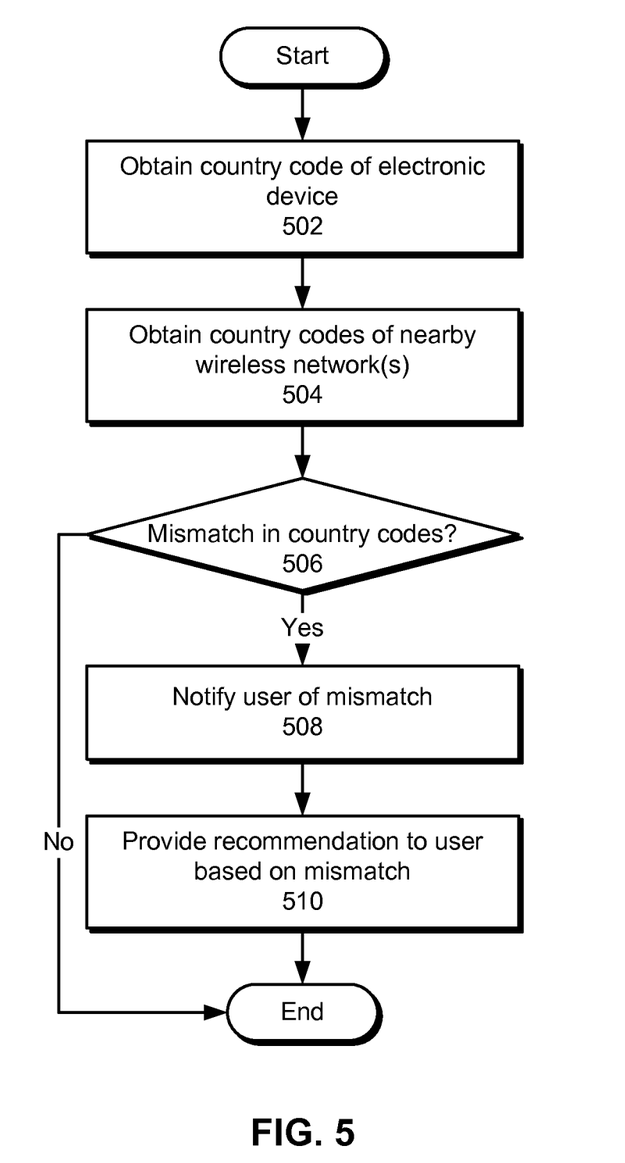
FIG. 5 shows a flowchart illustrating the process of running a test case associated with wireless network connectivity issues on an electronic device in accordance with the disclosed embodiments.

FIG. 5 shows a flowchart illustrating the process of running a test case associated with wireless network connectivity issues on an electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a country code of the electronic device is obtained (operation 502), along with country codes of one or more nearby wireless networks (operation 504), such as WiFi networks. For example, the electronic device's country code may be obtained from the wireless network configuration of the electronic device, and the country code of each nearby wireless network may be obtained from a beacon frame from the wireless network.

The country codes may then be compared to identify a mismatch (operation 506). If no mismatch exists, wireless connectivity issues on the electronic device may not be caused by a mismatch in the country codes, and other test cases may be run to diagnose and/or resolve the wireless network connectivity issues.

If a mismatch does exist, a user of the electronic device is notified of the mismatch (operation 508), and a recommendation is provided to the user based on the mismatch (operation 510). For example, the mismatch may cause the electronic device to reject channels that may be required to rejoin a saved wireless network. As a result, a set of country code mismatches may be provided to the user, and the user may be recommended to contact network administrators of each wireless network with which a country code mismatch exists to resolve the mismatches.

Figure 6:
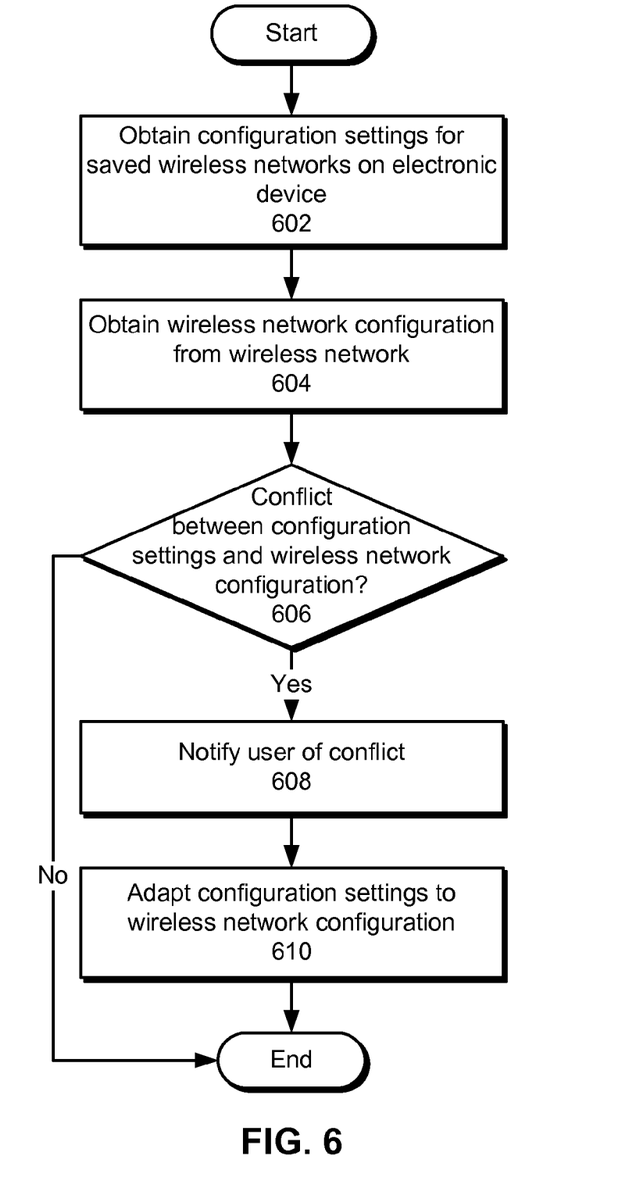
FIG. 6 shows a flowchart illustrating the process of running a test case associated with wireless network connectivity issues on an electronic device in accordance with the disclosed embodiments.

FIG. 6 shows a flowchart illustrating the process of running a test case associated with wireless network connectivity issues on an electronic device in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, configuration settings for a set of saved wireless networks on the electronic device are obtained (operation 602), and a wireless network configuration is obtained from a wireless network (operation 604) associated with the wireless network connectivity issues. For example, the configuration settings may be obtained from one or more system configuration files on the electronic device, and the wireless network configuration may be included in a beacon frame from the wireless network.

A conflict between the configuration settings and the wireless network configuration may be found (operation 606). For example, the configuration settings and wireless network configuration may have conflicting security settings, thus preventing the electronic device from automatically connecting to the wireless network using the configuration settings. If no conflict is found, wireless network connectivity issues on the electronic device may be diagnosed and/or resolved using other test cases.

If a conflict is found, a user is notified of the conflict (operation 608), and the configuration settings are adapted to the wireless network configuration (operation 610) to automatically resolve the conflict. For example, the user may be notified of a conflict between the security setting of the wireless network and a security setting shown for a saved wireless network of the same name. A wireless network connection between the electronic device and the wireless network may then be automatically enabled by changing the security setting for the saved wireless network to match that of the wireless network.

Figure 7:
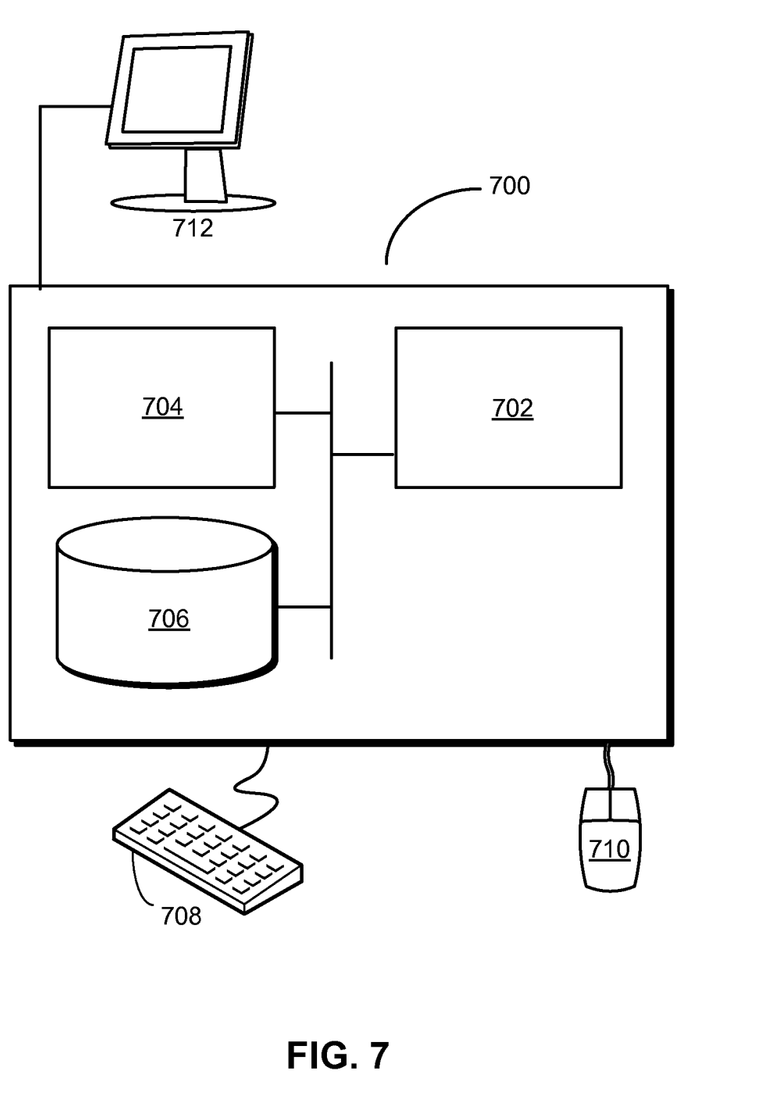
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic devices such as personal computers, laptop computers, tablet computers, mobile phones, and/or portable media players. Processor 702 may support parallel processing and/or multi-threaded operation with other processors in computer system 700. Computer system 700 may also include input/output (I/O) devices such as a keyboard 708, a mouse 710, and an integrated and/or external display 712. Finally, computer system 700 may include a wireless network interface (not shown) that provides a baseband processor and/or radio-frequency (RF) circuitry and implements WiFi and/or other wireless networking functionality, as well as an antenna (not shown) coupled to the wireless network interface that enables transmission and receipt of RF signals on computer system 700.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating use of a wireless network connection. The system includes a tool for automatically diagnosing and resolving wireless network connectivity issues on the electronic device. The tool may run a test case associated with the wireless network connectivity issues. For example, the test case may attempt to perform DNS resolution on the wireless network connection using a wireless network configuration of the electronic device. Upon detecting a failure of the electronic device to perform the DNS resolution, the test case may determine whether the wireless network configuration includes a custom DNS entry. If the wireless network configuration includes the custom DNS entry, the test case may attempt to perform the DNS resolution without the custom DNS entry. Next, the test case may notify a user of the electronic device of a lack of wireless network connectivity caused by an invalidity of the custom DNS entry upon subsequently detecting an ability of the electronic device to perform the DNS resolution without the custom DNS entry. Finally, the test case may automatically resolve the failure by removing the custom DNS entry from the wireless network configuration.

The tool may also monitor and manage the wireless network connection on the electronic device. For example, the tool may run one or more additional test cases on the electronic device, notify the user of one or more results of the one or more additional test cases, provide recommendations associated with the one or more results to the user, and/or log data associated with the one or more additional test cases.

In addition, one or more components of computer system 700 may be remotely located and connected to the other components over a network. Portions of the present embodiments (e.g., tool, communication apparatus, electronic devices, etc.) may also be located on different nodes of a distributed system that implements the embodiments. For example, the present embodiments may be implemented using a cloud computing system that monitors and manages wireless network connections for a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method executed by an electronic device to diagnose a wireless network connectivity problem of the electronic device, comprising:

detecting the wireless network connectivity problem;

performing a first Domain Name System (DNS) resolution test using a wireless network configuration of the electronic device;
determining that the first DNS resolution test fails;
determining that the wireless network configuration includes a custom DNS entry;
performing a second DNS resolution test without the custom DNS entry;
determining that the second DNS resolution test without the custom DNS entry succeeds; and
determining a recommendation comprising removing the custom DNS entry from the wireless network configuration.

2. The computer-implemented method of claim 1, wherein prior to performing the first DNS resolution test, the method further comprises:
performing first and second connectivity tests based at least in part on the wireless network configuration of the electronic device, wherein the first connectivity test is associated with a different protocol layer than the second connectivity test.

3. The computer-implemented method of claim 1, wherein the detecting the wireless network connectivity problem comprises receiving a notification or another connectivity test result.

4. The computer-implemented method of claim 1, further comprising:
monitoring a wireless network connection of the electronic device.

5. The computer-implemented method of claim 1, further comprising:
presenting the recommendation; or
logging data associated with the first and the second DNS resolution tests.

6. The computer-implemented method of claim 1, wherein performing the first DNS resolution test comprises:
attempting to resolve an address of a domain name using the wireless network configuration.

7. The computer-implemented method of claim 1, wherein the second DNS resolution test comprises:
a default DNS entry; or
a DNS service.

8. An electronic device, comprising:
a memory;
a wireless network interface comprising radio frequency circuitry; and
a processor,
wherein the processor:
performs first and second connectivity tests based at least in part on a wireless network configuration of the electronic device, wherein the first connectivity test is associated with a different protocol layer than the second connectivity test;
performs a first Domain Name System (DNS) resolution test using the wireless network configuration of the electronic device; and
based at least in part on results of the first and second connectivity tests and the first DNS resolution test, determines a recommendation.

9. The electronic device of claim 8, wherein the processor identifies a lack of wireless network connectivity prior to the performance of the first DNS resolution test.

10. The electronic device of claim 9, wherein, to identify the lack of wireless network connectivity, the processor receives a notification or another connectivity test result.

11. The electronic device of claim 8, wherein the processor monitors a wireless network connection of the electronic device.

12. The electronic device of claim 8, wherein the processor: presents the recommendation; or
logs data associated with the first and second connectivity tests.

13. The electronic device of claim 8, wherein the processor:
determines that the first DNS resolution test fails;
determines that the wireless network configuration includes a custom DNS entry;
performs a second DNS resolution test without the custom DNS entry;
determines that the second DNS resolution test succeeds; and
removes the custom DNS entry from the wireless network configuration.

14. The electronic device of claim 13, wherein for the second DNS resolution test, the processor uses:
a default DNS entry; or
a DNS service.

15. The electronic device of claim 8, wherein the processor attempts to resolve an address of a domain name using the wireless network configuration.

16. A non-transitory computer-readable medium having instructions stored therein, which when executed by a processor in an electronic device cause the processor to perform operations, the operations comprising:
detecting a problem of a wireless network connectivity of the electronic device, comprising:
performing a first Domain Name System (DNS) resolution test using a wireless network configuration of the electronic device;
receiving a wireless network configuration of a wireless network;
determining a conflict between settings of the wireless network configuration of the electronic device and the wireless network configuration of the wireless network; and
determining a recommendation based at least in part on the first DNS resolution test and the determined conflict.

17. The non-transitory computer-readable medium of claim 16, the operations further comprising:
identifying a lack of wireless network connectivity prior to the performing the first DNS resolution test.

18. The non-transitory computer-readable medium of claim 17, wherein the identifying the lack of wireless network connectivity comprises receiving a notification or another connectivity test result.

19. The non-transitory computer-readable medium of claim 16, the operations further comprising:
monitoring a wireless network connection of the electronic device.

20. The non-transitory computer-readable medium of claim 16, the operations further comprising:
presenting the recommendation; or
logging data associated with the determined conflict.

21. The non-transitory computer-readable medium of claim 16, the operations further comprising:
determining that the first DNS resolution test fails;
determining that the wireless network configuration of the electronic device includes a custom DNS entry;
performing a second DNS resolution test without the custom DNS entry;

determining that the second DNS resolution test succeeds; and removing the custom NS entry from the wireless network configuration.

22. The non-transitory computer-readable medium of claim 21, wherein the second DNS resolution test comprises a default DNS entry or a DNS service.

23. The non-transitory computer-readable medium of claim 16, wherein performing the first DNS resolution test comprises attempting to resolve an address of a domain name using the wireless network configuration of the electronic device.

24. The non-transitory computer-readable medium of claim 16, wherein the settings comprise a security type, a country code, a beacon interval, a delivery traffic indication message value, and a non-default wireless network configuration of the electronic device.

* * * * *

UNITED STATES PATENT AND TRADEMARK OFFICE
CERTIFICATE OF CORRECTION

PATENT NO. : 9,565,085 B2
APPLICATION NO. : 13/890036
DATED : February 7, 2017
INVENTOR(S) : Balachandran et al.

Page 1 of 1

It is certified that error appears in the above-identified patent and that said Letters Patent is hereby corrected as shown below:

In the Claims

Claim 21, Column 15, Line 3, "custom NS entry" should read --custom DNS entry--.

Signed and Sealed this
Seventeenth Day of April, 2018

Andrei Iancu
*Director of the United States Patent and Trademark Office*